(12) United States Patent
Ha et al.

(10) Patent No.: US 11,734,467 B2
(45) Date of Patent: Aug. 22, 2023

(54) DEVICE AND METHOD OF AUTOMATICALLY GENERATING AUTOCAD DRAWINGS, AND COMPUTER-READABLE MEDIUM STORING COMPUTER PROGRAM THEREFOR

(71) Applicant: Samsung Engineering Co., Ltd., Seoul (KR)

(72) Inventors: Gyun Ho Ha, Seoul (KR); Kang Gook Park, Seoul (KR); Sung Jin Moon, Seoul (KR); Byung Do Yoon, Seoul (KR); Geun Yong Choi, Seoul (KR); Sung Won Jang, Seoul (KR); Ji Yoon Hyun, Seoul (KR); Ho Jin Yang, Seoul (KR)

(73) Assignee: SAMSUNG ENGINEERING CO., LTD., Seoul (KR)

( * ) Notice: Subject to any disclaimer, the term of this patent is extended or adjusted under 35 U.S.C. 154(b) by 0 days.

(21) Appl. No.: 17/861,787

(22) Filed: Jul. 11, 2022

(65) Prior Publication Data
US 2023/0088500 A1    Mar. 23, 2023

(30) Foreign Application Priority Data
Sep. 17, 2021    (KR) .................. 10-2021-0125221

(51) Int. Cl.
*G06F 30/12*    (2020.01)
*G06F 3/04842*    (2022.01)
(Continued)

(52) U.S. Cl.
CPC .......... *G06F 30/12* (2020.01); *G06F 3/04842* (2013.01); *G06F 30/20* (2020.01); *G06F 2111/10* (2020.01)

(58) Field of Classification Search
CPC ...... G06F 30/12; G06F 30/20; G06F 3/04842; G06F 2111/10
(Continued)

(56) References Cited

FOREIGN PATENT DOCUMENTS

| JP | 2005267475 A | * | 9/2005 | ............. Y02P 90/30 |
| JP | 2010086515 A | * | 4/2010 | ............. G06F 17/50 |

(Continued)

OTHER PUBLICATIONS

Gujarathi, G. P., and Y-S. Ma. "Parametric CAD/CAE integration using a common data model." Journal of Manufacturing Systems 30.3 (2011). pp. 118-132. (Year: 2011).*
(Continued)

*Primary Examiner* — John E Johansen
(74) *Attorney, Agent, or Firm* — Panitch Schwarze Belisario & Nadel LLP

(57) ABSTRACT

A method of automatically generating AutoCAD drawings includes: receiving, by a receiving unit, a data sheet generated only with input data necessary for drawing a column from strength calculation data for the column provided by a strength calculation program; loading, by a loading unit, the input data; and generating AutoCAD drawings of the column by activating an automatic AutoCAD drawing generation interface by a user's selection after the input data is loaded, the automatic AutoCAD drawing generation interface being activatable only after the input data is loaded.

14 Claims, 20 Drawing Sheets

(51) Int. Cl.
*G06F 30/20* (2020.01)
*G06F 111/10* (2020.01)

(58) Field of Classification Search
USPC .............................................. 703/1
See application file for complete search history.

(56) References Cited

FOREIGN PATENT DOCUMENTS

| | | | | | |
|---|---|---|---|---|---|
| JP | 2021056704 | A | * | 4/2021 | ............. G06F 16/24 |
| KR | 158453 | B1 | * | 12/1998 | ............. B01D 3/008 |
| KR | 381863 | B1 | * | 5/2003 | ............. G06Q 50/04 |
| KR | 2011139996 | A | * | 12/2011 | ........ G06F 17/30327 |
| KR | 2046147 | B1 | * | 11/2019 | ............. G06F 30/13 |
| KR | 2252065 | B1 | * | 5/2021 | ............. G06F 30/18 |

OTHER PUBLICATIONS

Asilian, Mahabadi Hasan, et al. "A New exhaust ventilation system design software." (2007). pp. 235-242. (Year: 2007).*
A classification framework for automated control code generation in industrial automation, Heiko Koziolek etc., Journal of System and Software, vol. 166, 110575, 2020.8. See fig. 3, p. 3-8. (Year: 2020).*

* cited by examiner

FIG. 3
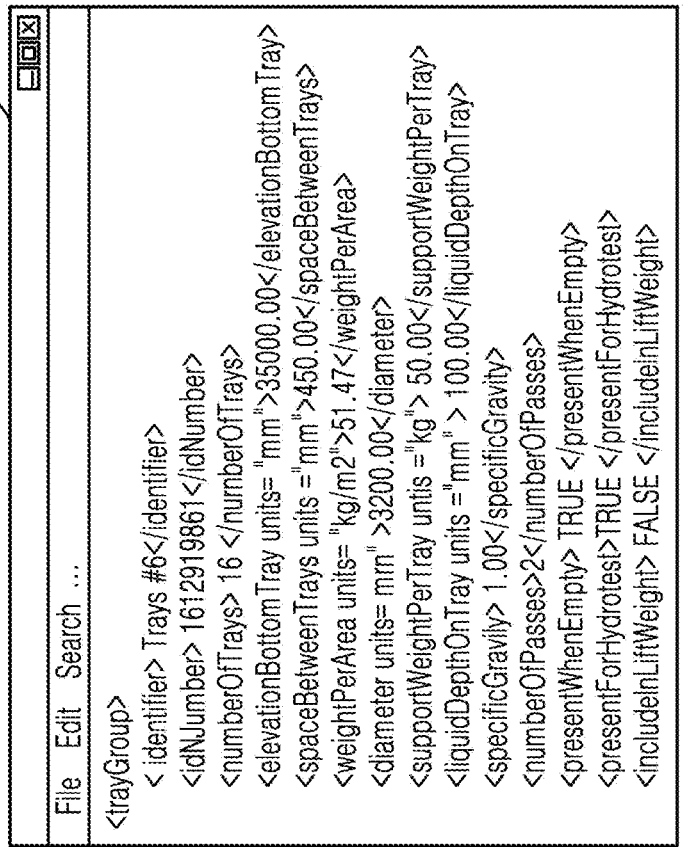
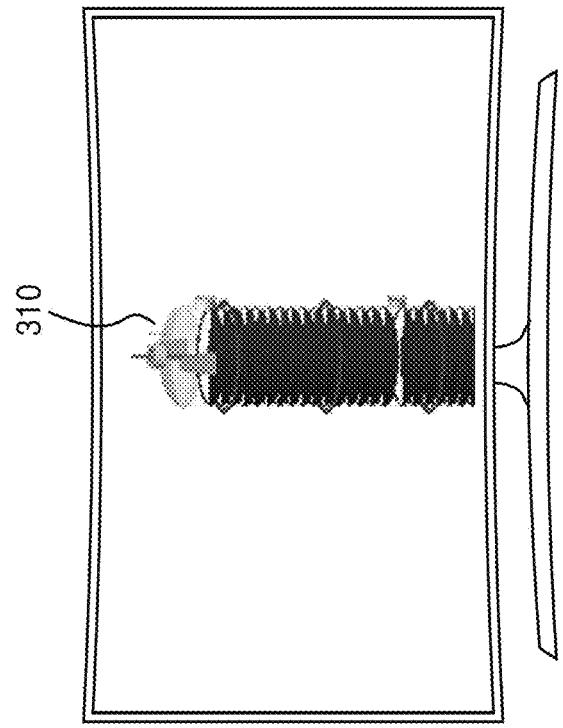

FIG. 5

```
File  Edit  Search ...
<tagNumber></tagNumber>
<tagClass></tagClass>
<tagcategory></tagcategory>
<!-- Design Code Info -->
<designCode>ASME Section VIII Division 1</designCode>
<designCodeEdition>2017</designCodeEdition>
<!-- Vessel Data -->
<units>S.I.</units>
    <outerDiameter units="mm">671.60</outerDiameter>
    <innerCorrosion units="mm">0.00</innerCorrosion>
    <outerDiameter units="mm">0.00</outerDiameter>
    <nominalThickness units="mm">31.00</nominalThickness units>
    <length units>2498.40</length>
    <designPressure units="kPa">8000.00</designPressure>
    <designTemperature units="degC">343.33</designTemperature units>
    <externalPressure units="kPa">103.42</externalPressure units>
    <externalTemperature units="degC">343.33</externalTemperature units>
    <designMDMT units="degC">-90.00</designMDMT units>
...
```

320b

| 1) Design Data | |
|---|---|
| CODE | ASME Section VIII Division 1 2017 |
| SPECIFIC GRAVITY | 0.86 |
| LETHAL/TOXIC SERVICE (YES/NO) | No |
| DESIGN INTERNAL PRESSURE | 1640 |
| DESIGN EXTERNAL PRESSURE | 150 |
| DESIGN INTERNAL TEMPERATURE | 231 |
| DESIGN EXTERNAL TEMPERATURE | 231 |
| CORROSION ALLOWANCE | 0 |
| R.T. (HEAD) | FULL |
| R.T. (SHELL) | FULL |
| JOINT EFFICIENCY (HEAD) | |
| JOINT EFFICIENCY (HEAD) | |
| POST WELD HEAT TREATMENT | None |
| STRESS RELIEVED | |
| HYDRO. TEST PRESSURE (AT SHOP) | 2460 |
| HYDRO. TEST PRESSURE (AT FIELD) | 2460 |
| PNEUMATIC TEST PRESSURE (AT SHOP) | |
| MAWP | 17 |
| MAP | 17 |
| MDMT | -33.15 |
| PWHT | None |
| INSULATION | N/A |
| FIREPROOFING (IN/OUT) | N/A |
| WIND CODE | ASCE |
| SEISMIC CODE | ASCE |
| IMPACT TEST | No |
| VOLUMN | 7.9 |
| FABRICATION WEIGHT | |
| ERECTION WEIGHT | |
| EMPTY WEIGHT | 6220 |
| OPERATING WEIGHT | 12000 |
| FULL OF WATER WEIGHT | 14230 |

330b

DEVICE AND METHOD OF AUTOMATICALLY GENERATING AUTOCAD DRAWINGS, AND COMPUTER-READABLE MEDIUM STORING COMPUTER PROGRAM THEREFOR

CROSS-REFERENCE TO RELATED APPLICATION

This application claims priority under 35 U.S.C. § 119(b) to Korean Application No. 10-2021-0125221, filed Sep. 17, 2021, this disclosure of which is incorporated herein by reference.

TECHNICAL FIELD

The present disclosure relates to a method of automatically generating AutoCAD drawings by using strength calculation data.

BACKGROUND ART

In the related art, users check data about strength calculation results obtained using a strength calculation program and then manually generate drawings by using a drawing tool of an AutoCAD program by manually inputting the data piece by piece to the drawing tool.

DISCLOSURE

Technical Problem

Embodiments of the present disclosure include a device and method of automatically generating AutoCAD drawings of the internal and external shapes of a column according to intended shapes by using data on strength calculation results.

Technical Solution

According to one or more embodiments, a device for automatically generating AutoCAD drawings includes: a preprocessing unit configured to extract, in a first format, only data necessary to draw a column drawing from strength calculation data for the column provided by a strength calculation program, and then convert the extracted data into a data sheet in a second format according to a certain rule or reference; a loading unit configured to load the data sheet; and a viewer configured to display at least one of an external shape of the column, an internal shape of the column, a multi-section orientation of the column, and information on each of objects of the column by using the loaded data sheet, wherein the viewer includes an automatic AutoCAD drawing generation interface that is activatable only after the data sheet is loaded and generates AutoCAD drawings of the column displayed on the viewer as being activated by a user's selection after the data sheet is loaded.

Advantageous Effects

According to an automatic AutoCAD drawing generation device and method of one or more embodiments, users do not need to check strength calculation data directly from documents or electronic files, input the checked strength calculation data to drawing tools of an AutoCAD program, and manually generate drawings. In addition, errors caused by missing data or the like in the process of manually generating drawings may be prevented.

In addition, a design period necessary for users to extract drawing data piece by piece and input the extracted drawing data may be saved, and thus the overall manufacturing period may be reduced.

DESCRIPTION OF DRAWINGS

FIG. 3 illustrates an example of strength calculation data, which is provided by a strength calculation program, according to an embodiment.

FIGS. 4 to 6 illustrate examples of converting strength calculation data into input data, according to embodiments.

BEST MODE

Figure 1:
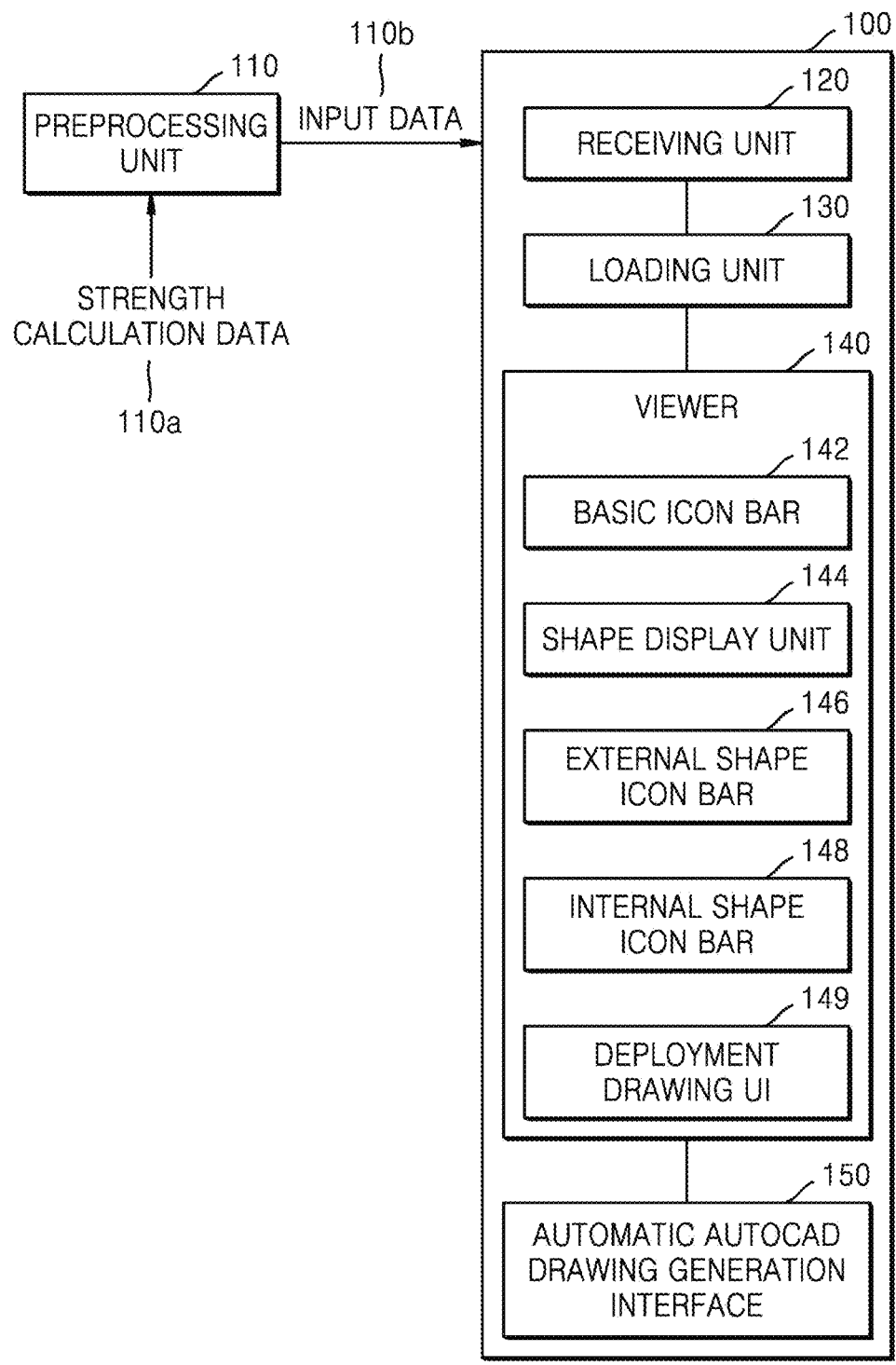
FIG. 1 illustrates an internal configuration of an automatic AutoCAD drawing generation device according to an embodiment.

According to an embodiment, a device for automatically generating AutoCAD drawings includes: a preprocessing unit configured to extract, in a first format, only data necessary to draw a column drawing from strength calculation data for the column provided by a strength calculation program, and then convert the extracted data into a data sheet in a second format according to a certain rule or reference; a loading unit configured to load the data sheet; and a viewer configured to display at least one of an external shape of the column, an internal shape of the column, a multi-section orientation of the column, and information on each of objects of the column by using the loaded data sheet, wherein the viewer includes an automatic AutoCAD drawing generation interface that is activatable only after the data sheet is loaded and generates AutoCAD drawings of the column displayed on the viewer as being activated by a user's selection after the data sheet is loaded.

When the automatic AutoCAD drawing generation interface is activated, a development drawing drawn by unfolding a shape of the column may be further generated in addition to the AutoCAD drawings, wherein the development drawing may show a situation of interference with a welding seam, a nozzle, and internal and external attachments.

The viewer may include an internal shape icon bar providing an icon related to the internal shape of the column, wherein the internal shape icon bar may include at least one of a tray, a packing, a distributor, a bed limiter, a support plate, and a collector.

The icon related to the internal shape of the column may be displayed on the internal shape icon bar only when there is strength calculation data provided from the data sheet.

The preprocessing unit may be further configured to extract an installation position of the internal shape of the column in the first format and an installation position of a nozzle in the first format, and then map the installation position of the nozzle to correspond to the installation position of the internal shape of the column, and convert a mapping result into a data sheet in a second format.

The viewer may include a development drawing interface for checking all welding seam interference, wherein the development drawing interface may be activatable after the loading of the data sheet is completed, display an area where interference occurs, and support editing of the area where the interference occurs.

According to another embodiment, a method of automatically generating AutoCAD drawings includes: receiving, by a receiving unit, a data sheet generated only with input data necessary for drawing a column from strength calculation data for the column provided by a strength calculation program; loading, by a loading unit, the input data; and generating AutoCAD drawings of the column by activating an automatic AutoCAD drawing generation interface by a user's selection after the input data is loaded, the automatic AutoCAD drawing generation interface being activatable only after the input data is loaded.

The method may further include generating, by a preprocessing unit, the data sheet by extracting only data necessary to draw all objects of the column from strength calculation data in a first format, provided by a strength calculation program and obtained for the column, and converting a format of the extracted data into a second format.

According to another embodiment, a method of automatically generating AutoCAD drawings include: extracting, by a preprocessing unit, in a first format only data necessary to draw a column from strength calculation data for the column provided by a strength calculation program, and then converting the extracted data into a data sheet in a second format according to a certain rule or reference; loading, by a loading unit, the data sheet; and displaying, by a viewer, at least one of an external shape of the column, an internal shape of the column, a multi-section orientation of the column, and information on each of objects of the column by using the loaded data sheet, wherein the viewer includes an automatic AutoCAD drawing generation interface which is activatable only after the data sheet is loaded and generates an AutoCAD drawing of an object constituting a shape of the column displayed on the viewer as being activated by a user's selection after the data sheet is loaded.

When the development drawing interface is activated, a development drawing, in which interference between welding seams is capable of being checked first before the AutoCAD drawing is generated, may be generated and the generated development drawing may be further modified to remove the interference.

The data sheet may include information on an internal shape of a tray and the information on the internal shape of the tray may include shape information for each pass, elevation information, spacing information, and downcomer information, wherein the internal shape of the tray may be displayed on the generated AutoCAD drawing and a shape of each pass may be displayed on the internal shape of the tray.

The converting may include: extracting, by a data extraction unit, at least one data, which corresponds to an item preset for each of the objects in order to draw all the objects constituting the column, from a preset position of the strength calculation data in the first format; generating, by a mapping table generating unit, a mapping table providing general information including unit information corresponding to the item preset in order to draw each of the objects constituting the column; and generating, by an input data generation unit, a data sheet by converting a format of at least one data extracted from the preset location or data in the mapping table into the second format.

The AutoCAD drawing of the column may include information on an internal shape of the column and information on an orientation of each section of a nozzle, wherein the information on the internal shape of the column may include tray internal shape information, inlet distributor internal shape information, and packing internal shape information.

MODE FOR INVENTION

Hereinafter, embodiments will be described with reference to the accompanying drawings so that those of ordinary skill in the related art may clearly understand the scope of the present disclosure and may easily implement the idea of the present disclosure.

FIG. 1 illustrates an internal configuration of an automatic AutoCAD drawing generation device 100 according to an embodiment.

The automatic AutoCAD drawing generation device 100 and a preprocessing unit 110 may be respectively implemented in different terminals or may be integrally implemented in the same terminal. Examples of such terminals include computers, laptop computers, smartphones, tablets, handheld devices, and wearable devices. The term "terminal" refers to a device that includes a processor and a display and is capable of running applications or programs.

Figure 10:
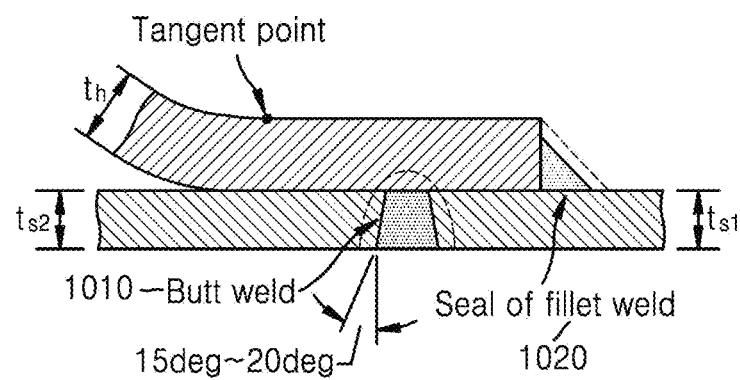
FIG. 10 illustrates an example of data values used to perform strength calculation in a strength calculation program, according to an embodiment.

The automatic AutoCAD drawing generation device 100 may include a receiving unit 120, a loading unit 130, a viewer 140, and an automatic AutoCAD drawing generation interface 150. The automatic AutoCAD drawing generation device 100 may receive input data 110b from the preprocessing unit 110. The preprocessor 110 may extract only the input data 110b from the strength calculation data 110a for the column, which is provided by the strength calculation program, or strength calculation data (not shown) automatically calculated using Equations 1 to 3. It should be noted that Equations 1 to 3 used in an embodiment are only some examples of various calculation methods and are not limited thereto. In an embodiment, the input data 110b refers to data necessary to draw all the objects constituting the column. According to another embodiment, Intermediate Head's Fillet Weld W1 (1020) in FIG. 10, Butt Weld W2 (1010) in FIG. 10, and Total Allowable Load Wt may be obtained by using strength calculation data values calculated through Equations 1 to 3 rather than a strength calculation program.

$$W1 = \Pi D t w f^*(0.55 Sa) \qquad \text{[Equation 1]}$$

$$W2 = \Pi D t w f^*(0.7 Sa) \qquad \text{[Equation 2]}$$

$$Wt = W1 + W2 \qquad \text{[Equation 3]}$$

In Equations 1 to 3, D denotes an intermediate head inside diameter (corroded), twf denotes the thickness of a fillet weld leg (corroded), and Sa denotes an allowable stress.

In the automatic AutoCAD drawing generation device 100, input data received through the receiving unit 120 may be loaded by the loading unit 130 and displayed on the viewer 140, and then the automatic AutoCAD drawing generation interface 150 may be activated to automatically generate AutoCAD drawings of the column.

According to an embodiment, the automatic AutoCAD drawing generation device 100 may generate an AutoCAD drawing and development drawing for a column when the automatic AutoCAD drawing generation interface 150 is activated.

In the automatic AutoCAD drawing generating device 100, input data received through the receiving unit 120 may be loaded by the loading unit 130 and displayed on the viewer 140, and then a development drawing may be displayed when a development drawing user interface (UI) 149 (see FIG. 1) is activated, and editing of an area where interference occurred may be supported. The development drawing UI 149 may be used to check the development drawing on a preview screen before the automatic AutoCAD drawing generation interface 150 is activated and a final AutoCAD drawing and development drawing are generated, and to correct the area where the interference occurred.

Figure 2:
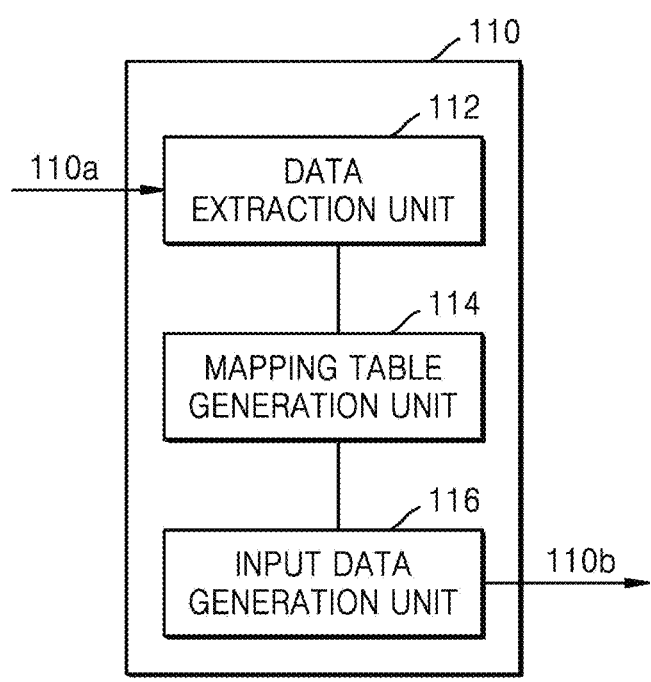
FIG. 2 illustrates an internal configuration of a preprocessing unit according to an embodiment.

Referring to FIG. 2, the preprocessing unit 110 may extract only the input data 110b from the strength calculation data 110a received from the strength calculation program. To this end, the preprocessing unit 110 may include a data extraction unit 112, a mapping table generation unit 114, and an input data generation unit 116.

An example of the strength calculation data 110a, which is calculated by the strength calculation program with regard to welding seam information, is as follows.

```
<longSeamsOptions>
    <LongSeamsActive>TRUE</LongSeamsActive>
    <ReferenceNorth>TRUE</ReferenceNorth>
    <LongSeamsPerShell>1</LongSeamsPerShell>
    <LongSeamEditType>0</LongSeamEditType>
    <NorthRefAng units="deg">0.00</NorthRefAng>
    <LongSeamStartingAngle units="deg">0.00</LongSeamStartingAngle>
    <LongSeamStaggerAngle units="deg">30.00</LongSeamStaggerAngle>
    <LongSeamPlateWidth units="mm">6096.00</LongSeamPlateWidth>
</longSeamsOptions>
```

An example of the strength calculation data 110a, which is calculated by the strength calculation program with regard to tray information, is as follows.

```
<trayGroup>
    <identifier>Trays #6</identifier>
    <idNumber>1612919861</idNumber>
    <numberOfTrays>16</numberOfTrays>
    <elevationBottomTray units="mm">35000.00</elevationBottomTray>
    <spaceBetweenTrays units="mm">450.00</spaceBetweenTrays>
    <weightPerArea units="kg/m2">51.47</weightPerArea>
    <diameter units="mm">3200.00</diameter>
    <supportWeightPerTray units="kg">50.00</supportWeightPerTray>
    <liquidDepthOnTray units="mm">100.00</liquidDepthOnTray>
    <specificGravity>0.62</specificGravity>
    <numberOfPasses>2</numberOfPasses>
    <presentWhenEmpty>TRUE</presentWhenEmpty>
    <presentForHydrotest>TRUE</presentForHydrotest>
    <includeInLiftWeight>FALSE</includeInLiftWeight>
```

An example of the input data 110b, which is obtained by automatically converting the example of the strength calculation data 110a according to a certain rule or reference, is as follows.

| TRAY | | | | | |
|---|---|---|---|---|---|
| NO. OF TRAY | PASS | SPACING | DIAMETER | LOCATION OF BOTTOM TRAY | TRAY TYPE |
| 16 | 1 | 450 | 3200 | 3500 | Valve tray |

Hereinafter, each element of the preprocessing unit 110 will be described with reference to FIGS. 3 to 6, and then the receiving unit 120, the loading unit 130, the viewer 140, and the automatic AutoCAD drawing generation interface 150 will be described with reference to FIGS. 7 to 16.

The data extraction unit 112 may receive strength calculation data 310 (see FIG. 3) about the column from the strength calculation program. Examples of the strength calculation program 310 include a compress program, a program for calculating strength by using Equations 1 to 3, and the like. The strength calculation data 320 may have an XML format, but this is only an example and various modifications may be made.

Figure 4:
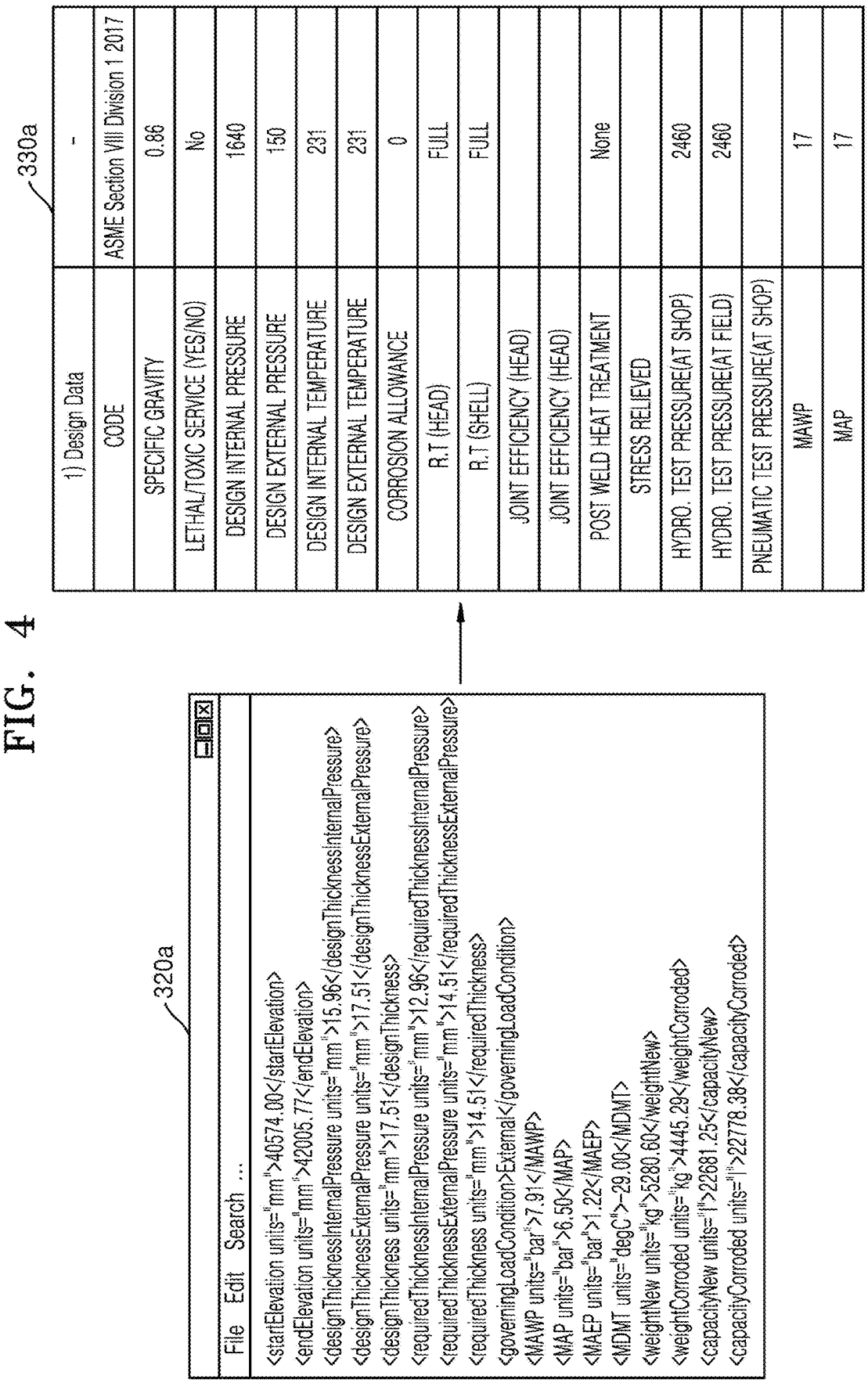

The data extraction unit 112 may extract input data from received strength calculation data 320, 320a, and 320b in the same manner as in the embodiment of FIGS. 4 to 5. In this case, the input data 330a and 330b may be a data sheet in the form of XLS or CSV format, but is not limited thereto and various modifications may be made.

The input data 330a and 330b may be a data sheet including at least one of general information 330c (see FIG. 6), design data 330a and 330b, a material list, a nozzle list, a nozzle load, a nozzle orientation, tray data, packing data, shell seam arrangement data, skirt seam arrangement data, inlet distributor data, foundation loading data, head data, shell data, cone data, girth flange data, stiffener ring data, skirt data, baseblock data, support lug data, support leg data, and saddle data.

Figure 6:
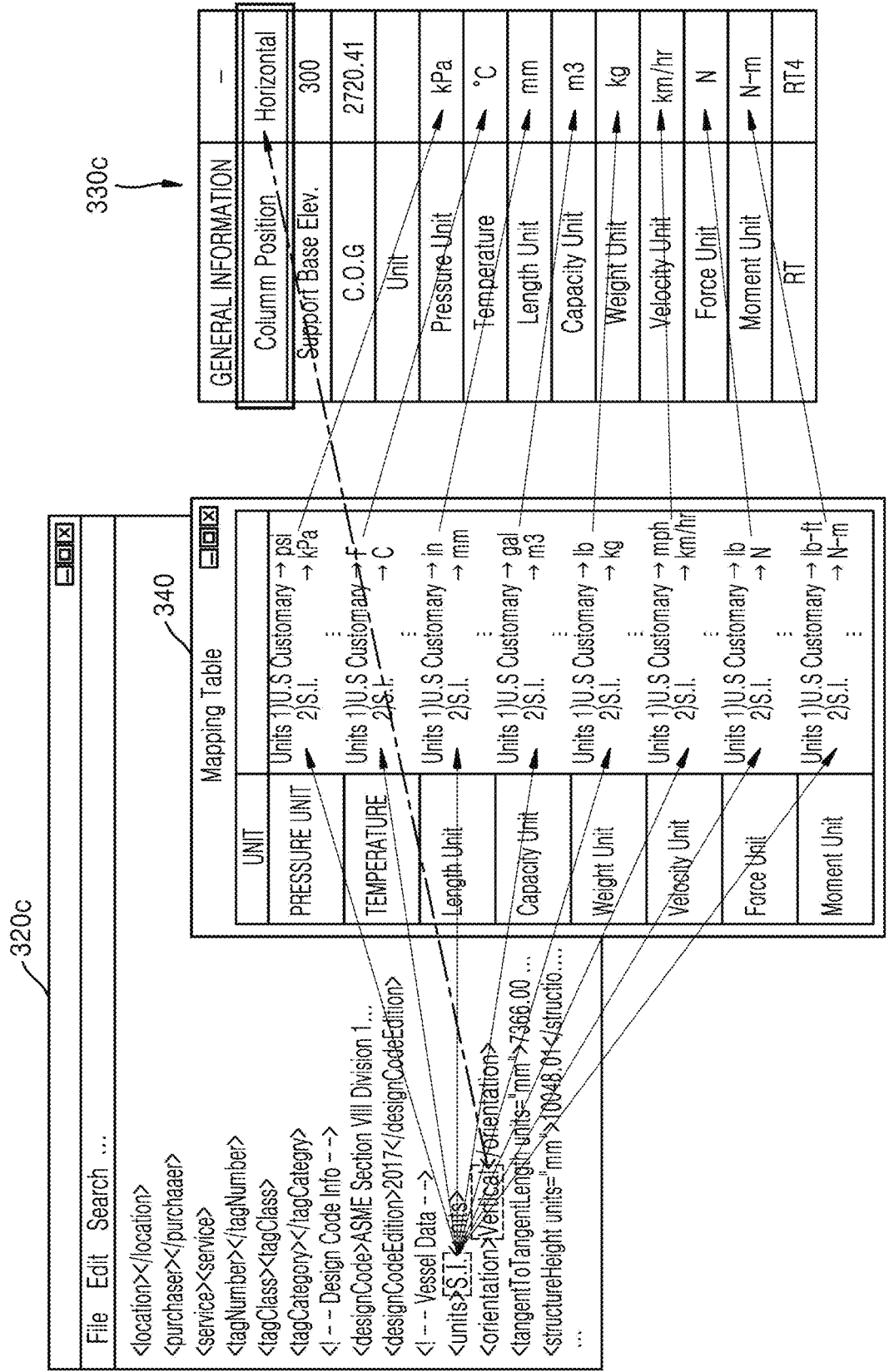

The general information 330c in FIG. 6 may include information, such as column position information, support base altitude degree, C.O.G information and pressure unit, temperature unit, length unit, weight unit, and speed unit. Examples of the design data 330a and 330b refer to FIGS. 3 and 4.

The material list contains information about shells, heads, skirts, support lugs, support legs, saddles, nozzle necks, nozzle flanges, nozzle blinds, nozzle fittings, and the like.

Returning back to FIG. 2, the data extraction unit 112 may extract the input data 330a in an XLS format by extracting a data value from a preset position of the strength calculation data 320a, as in the example of FIG. 4. Also, the data extraction unit 112 may extract the input data 330a in an XLS format by extracting data values from a plurality of preset positions of the strength calculation data 320b and combining the data values, as in the example of FIG. 5. The data extraction unit 112 may extract data by matching characters for items described in the input data 330a of FIG. 4 (for example, characters for data items described in the left column of the table of the input data 330a, such as 'CODE' and 'SPECIFIC GRAVITY') with characters at preset positions in the strength calculation data 320a, extracting data values for the matched characters, and writing the extracted data values in the right column of the table of the input data 330a. The data extraction unit 112 may extract input data required for preparing drawings by matching an item described in the input data 330b of FIG. 5 (for example, a 'CODE' item which is a reference design code) with 'designCode' and extracting 'ASME Section VIII Division', extracting '2017' from "designCodeEdition", and then writing the extracted values in the "CODE" item on the right column of the table of the input data 330b.

Referring to FIG. 6, the mapping table generation unit 114 may generate a mapping table 340 to provide general information 330c (see FIG. 6), which includes information on units corresponding to preset items for preparing drawings of all the objects constituting an equipment.

The input data generation unit 116 may generate input data by using the input data 330a and 330b extracted by the data extraction unit 112 in the manner shown in FIGS. 4 and 5 and the mapping table 340 shown in FIG. 6.

According to an embodiment, the preprocessing unit 110 may extract an installation position of the internal shape of a column displayed in an XML format and an installation position of a nozzle displayed in the XML format, and then may map the installation position of the nozzle to correspond to the installation position of the internal shape of the column, and convert a mapping result into a CSV format data sheet.

Figure 7:
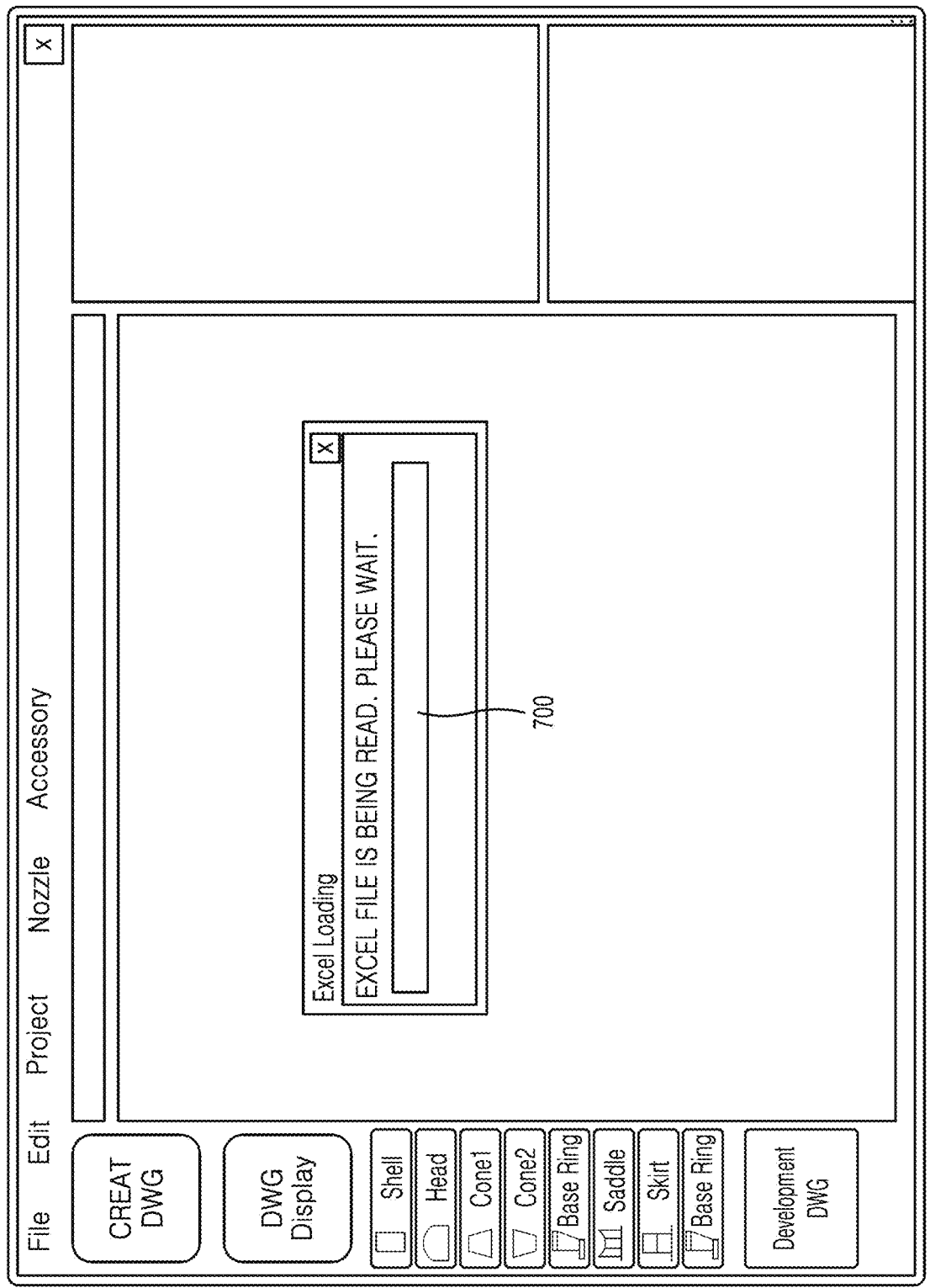
FIG. 7 illustrates an example of loading input data in an automatic AutoCAD drawing generation device according an embodiment.
Figure 8:
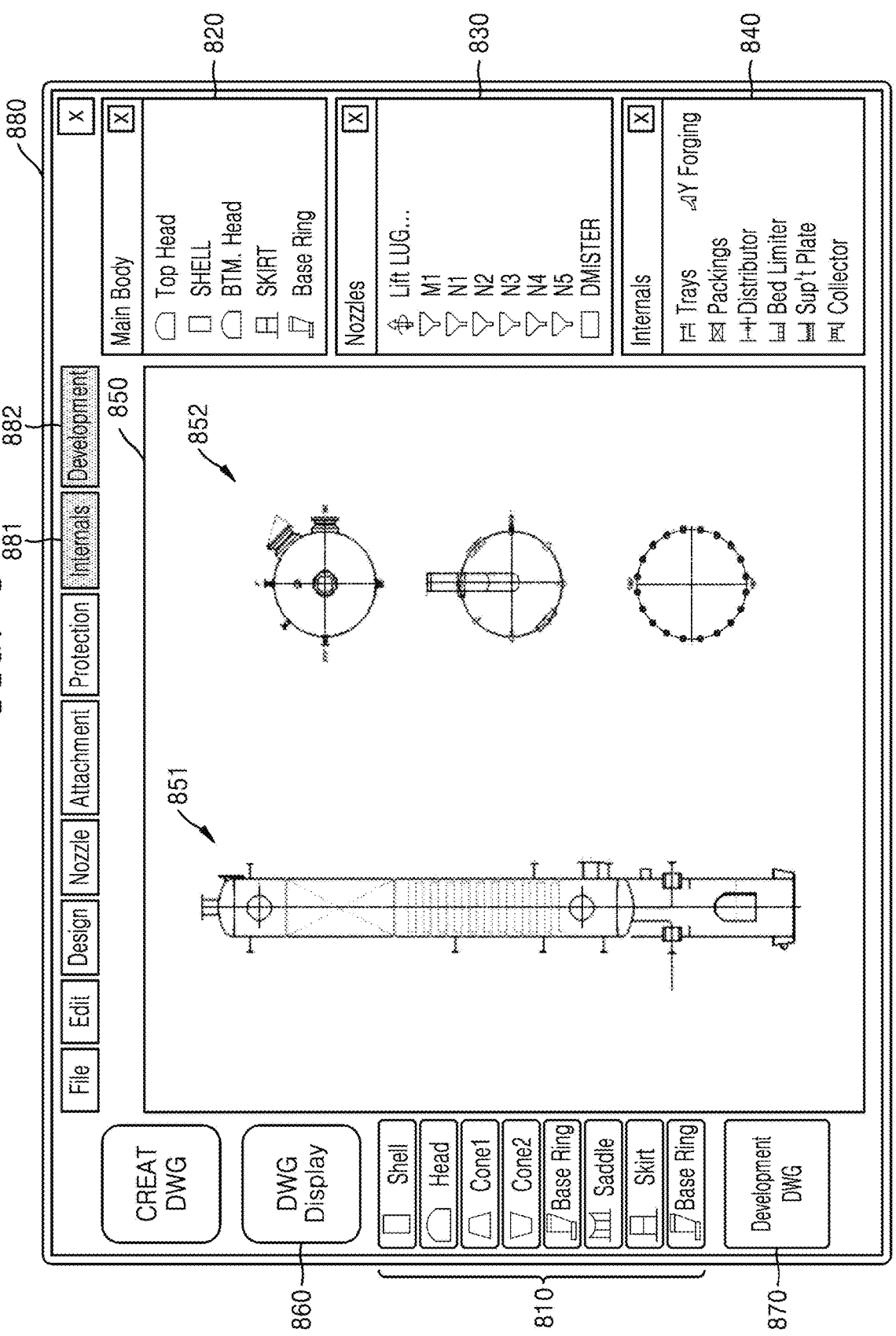
FIGS. 8 and 9 illustrates examples of an automatic AutoCAD drawing generation device in which input data is loaded, according embodiments.

Returning back to FIG. 1, the receiving unit 120 may receive the input data 110b from the preprocessing unit 110, and the loading unit 130 may load the input data 110b in the automatic AutoCAD drawing generation device 100. FIG. 7 illustrates an example of loading by a loading unit 700.

Referring to FIG. 7, before the loading of the input data 110b is completed, the automatic AutoCAD drawing generation device 100 does not have information on the components of the column of which drawings will be generated, and provides only a basic icon bar, an automatic AutoCAD drawing generation interface, and a development drawing interface. In this case, the automatic AutoCAD drawing generation interface and the development drawing interface may be activated only after loading is completed.

When the loading of the input data 110b is completed, a viewer 880 may display, on a shape display portion 850, at least one of an internal and external shape 851 of the column and a multi-section orientation 852 of the column. When the loading of the input data 110b is completed, an external shape icon bar 820 that provides an icon constituting the external shape of the column, a nozzle icon bar 830 that provides an icon of a nozzle constituting the column, and an internal shape icon bar 840 that provides an icon related to the internal shape of the column may be created on the viewer 880. The internal shape icon bar 840 may include at least one of a tray, a packing, a distributor, a bed limiter, a support plate, and a collector.

Figure 9:
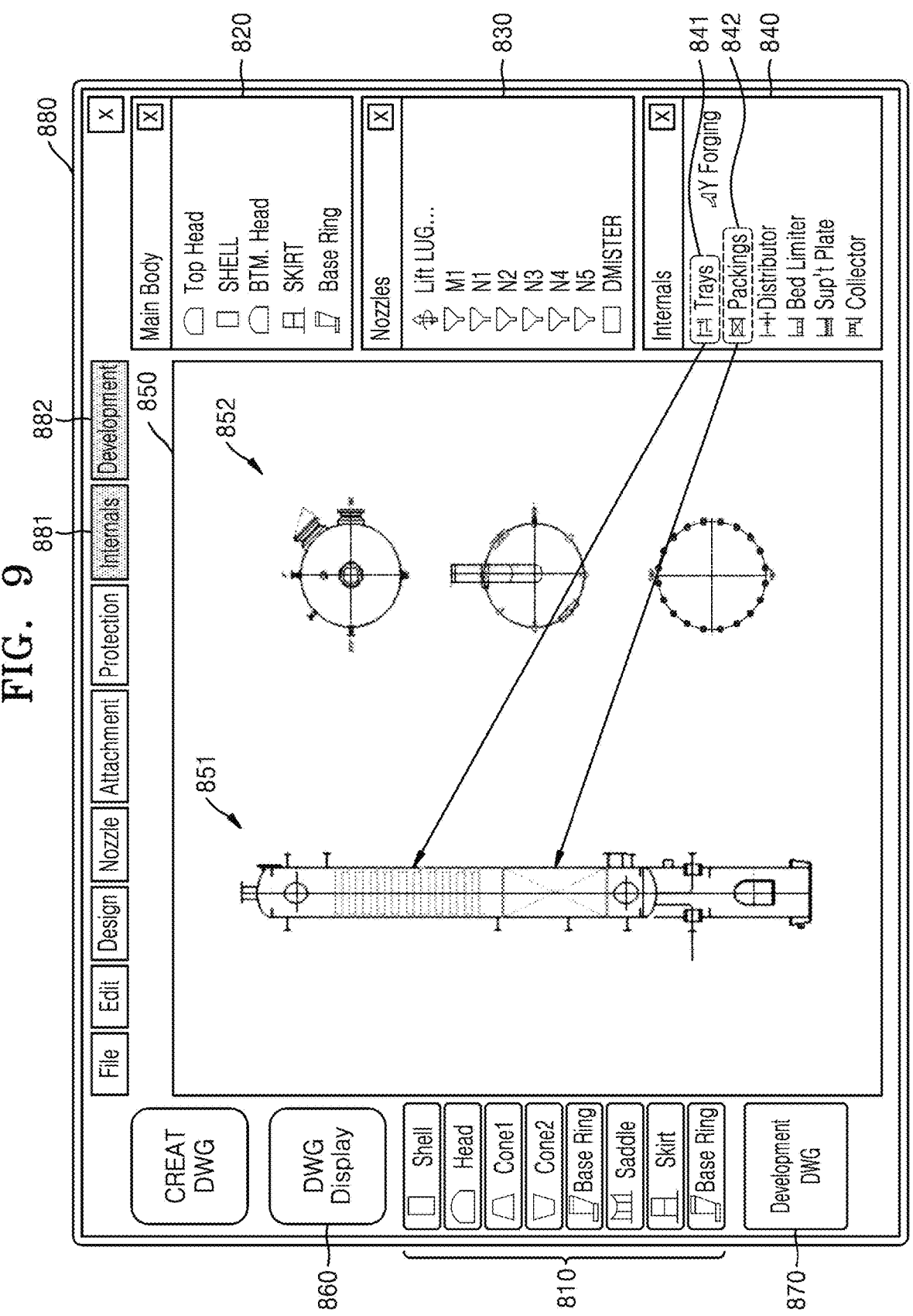

Referring to FIG. 9, the internal shape icon bar 840 may provide a tray 841, a packing 842, a distributor, a bed limiter, a support plate, a collector, and a Y posing. This means that the tray 841, the packing 842, the distributor, the bed limiter, the support plate, and the collector are included in a column displayed on the shape display portion 850.

According to an embodiment, the viewer 880 may further provide a tab 881 for editing shapes constituting the inside of the column and a tab 882 for editing shapes constituting the development drawing of the column. In the tab 881 for editing the shapes constituting the inside of the column, an internal shape 1600 of the column may be displayed on the shape display portion 850. In the tab 882 for editing the shapes constituting the development drawing of the column, a shape 1700 for editing welding seams of the column may be displayed on the shape display portion 850.

When the loading of the input data 110b is completed, a user may activate an automatic AutoCAD drawing generation interface 860 and a development drawing interface 870 in the viewer 900.

According to an embodiment, by activating the development drawing interface 870 to generate a preview development drawing, an area (i.e., an interference area) where interference occurred between all welding seams, and the cause of the interference may be checked in advance and edited. This will be described with reference to FIGS. 11 and 12.

Figure 11:
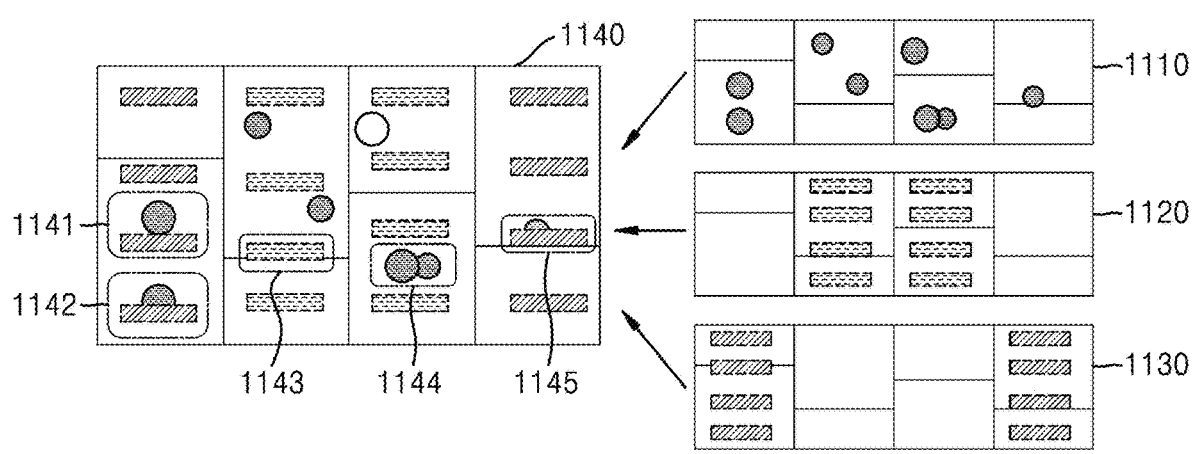
FIGS. 11 and 12 illustrate examples of a preview development drawing according embodiments.

In FIG. 11, Layer1 1110 shows a welding seam and a plate with open nozzles, Layer2 1120 shows a welding seam and an internal or external clip plate, and Layer3 1130 shows a welding seam and other plates. When the development drawing interface 870 is activated, a preview development drawing 1140 that may check interference between Layer1 1110, Layer2 1120, and Layer3 1130 may be generated. Interference areas 1141, 1142, 1143, 1144, and 1145 are displayed in the preview development drawing 1140, and a user may edit the interference areas 1141, 1142, 1143, 1144, and 1145 to remove an interference phenomenon.

Figure 12:
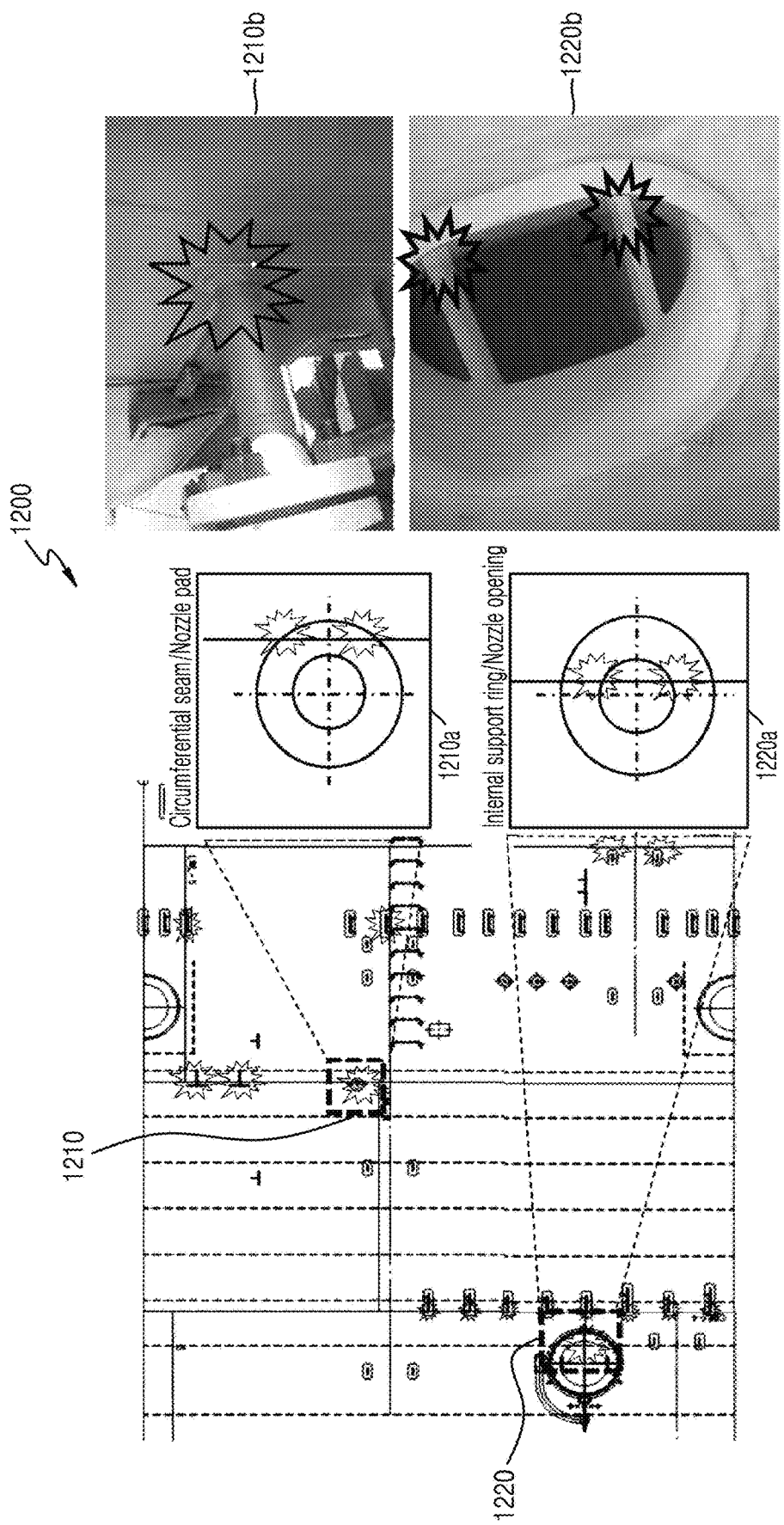

FIG. 12 is a diagram excerpted from a preview development drawing 1200 according to an embodiment. The preview development drawing 1200 may display interference areas. For example, a cloud mark or the like may be displayed on the interference areas. A portion 1210b shows an example in which interference between a nozzle pad and a circular seam occurs. As another example, when a second interference area 1220 is clicked, an enlarged screen 1220a may be displayed. A portion 1220b shows an example in which interference between a nozzle opening and an inner support ring occurs.

Figure 13:
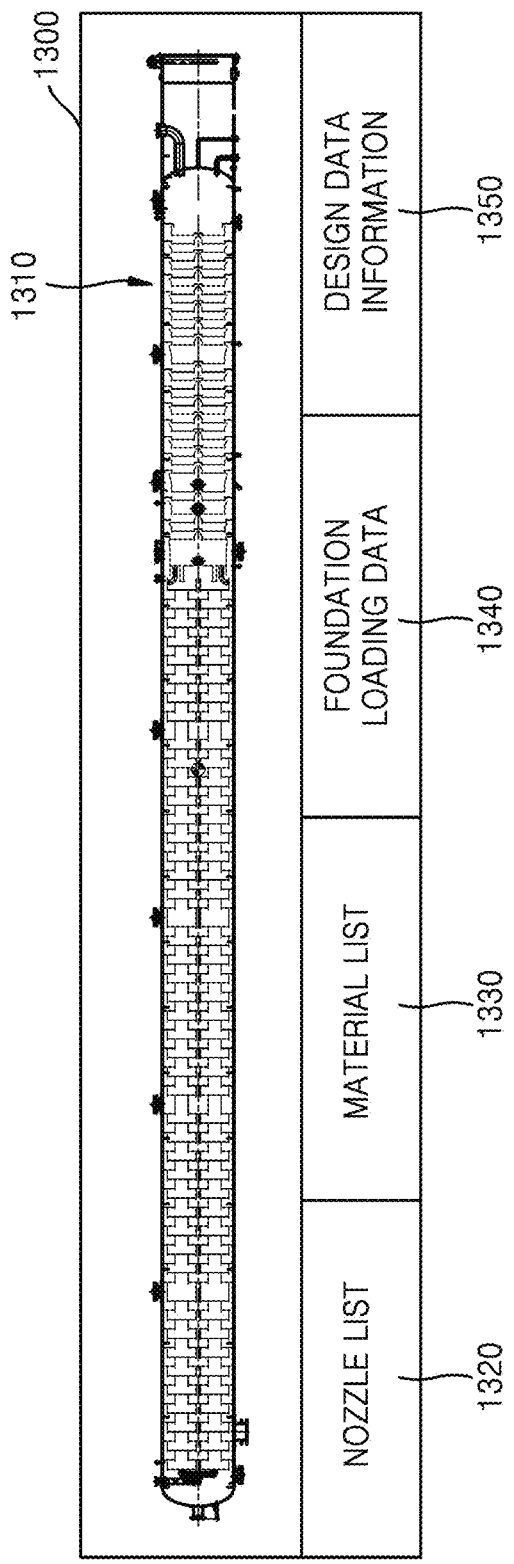
FIGS. 13 to 15 illustrate examples of an assembly drawing and a development drawing, generated when an automatic AutoCAD drawing generation interface is activated, according to embodiments.
Figure 14:
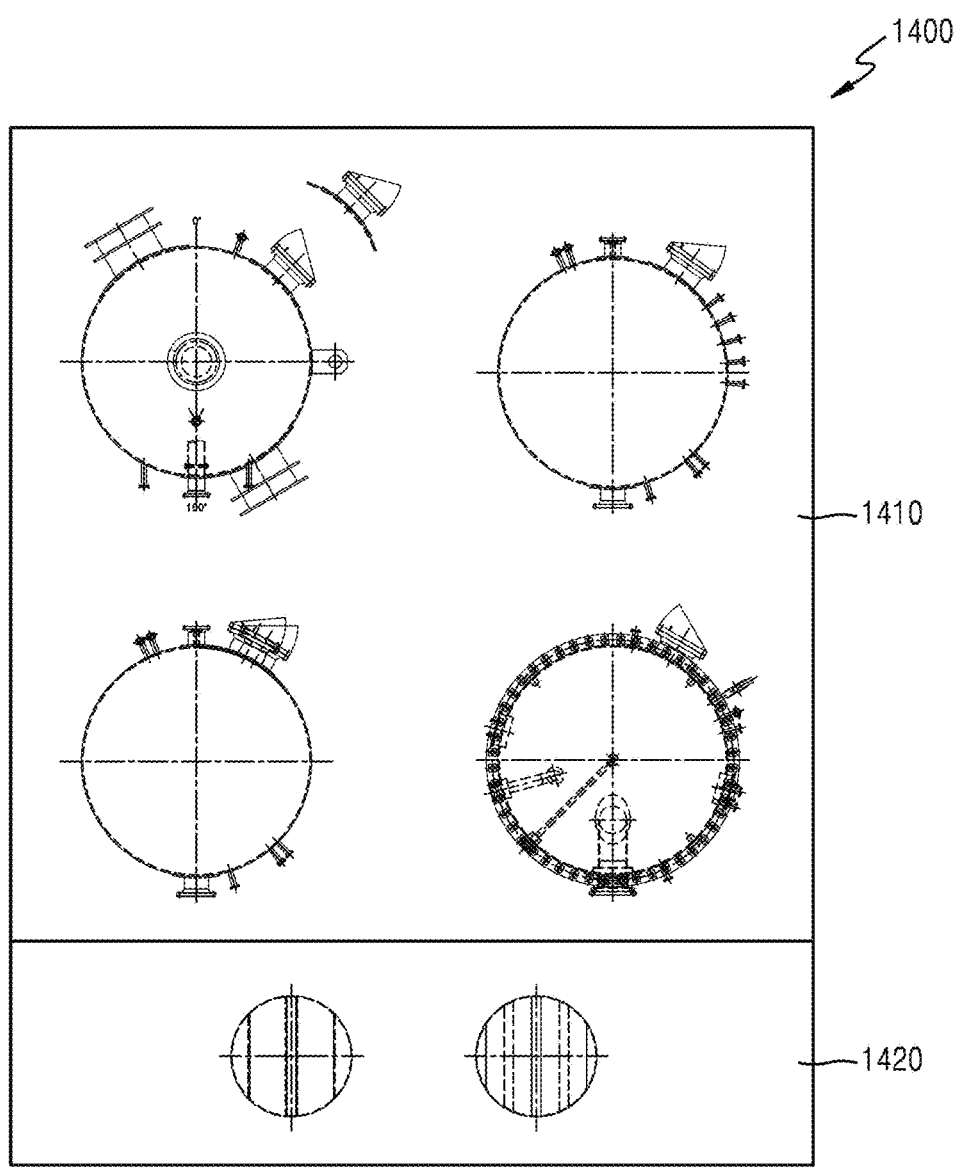
Figure 15:
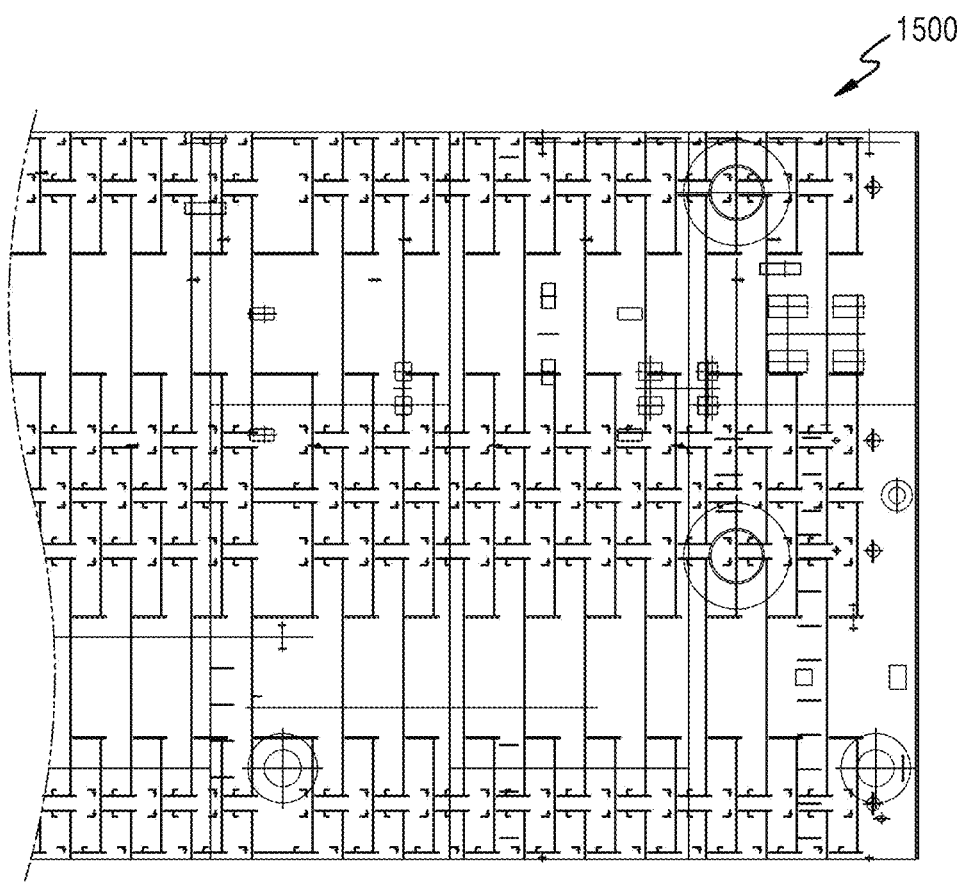
Figure 16:
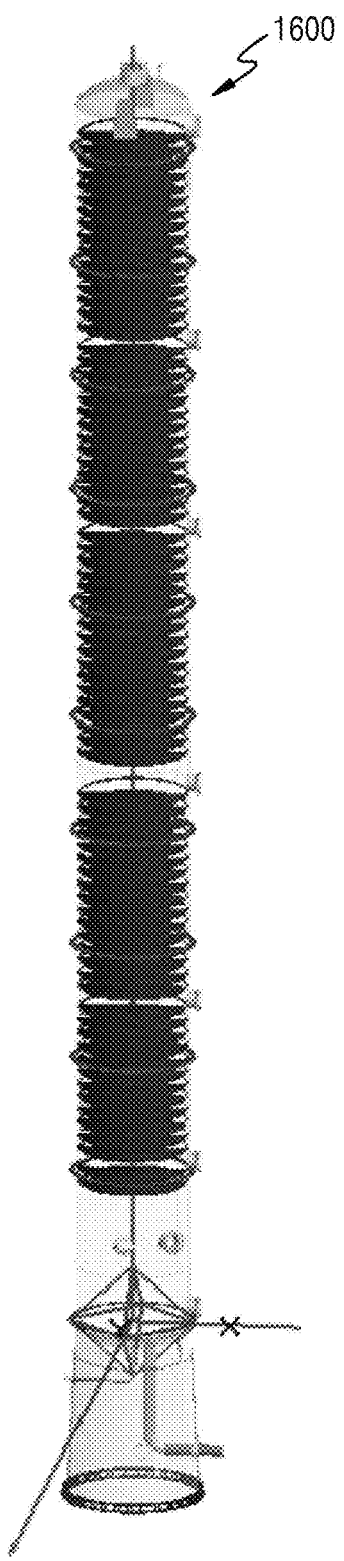
FIGS. 16 and 17 illustrate examples of shapes respectively displayed in a tab for editing shapes constituting the inside of a column and a tab for editing a development drawing of the column, according to embodiments.
Figure 17:
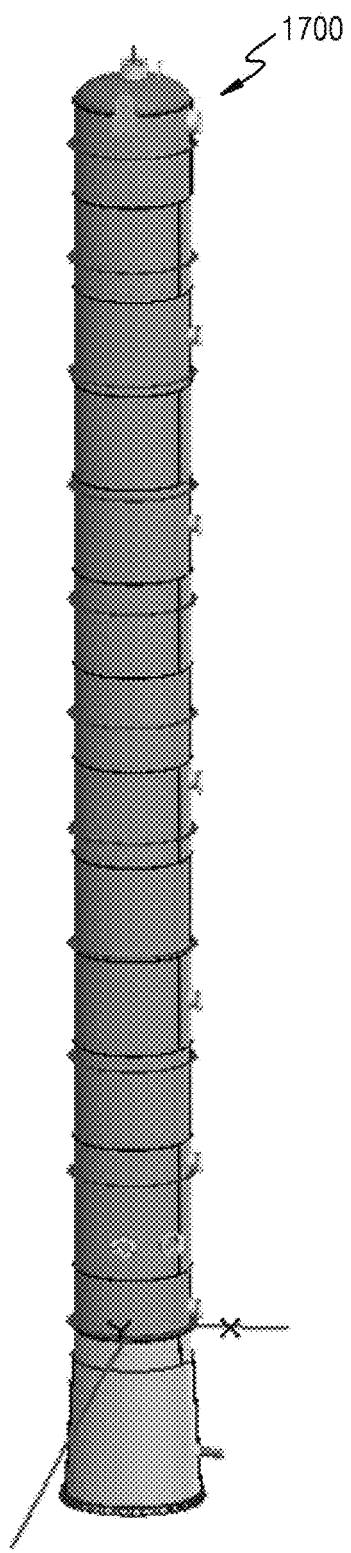

FIGS. 13 to 15 illustrate examples of an assembly drawing and a development drawing, generated when an automatic AutoCAD drawing generation interface is activated, according to an embodiment. FIGS. 13 to 14 illustrate an assembly drawing of a column. FIG. 15 illustrates a development drawing of the column.

Referring to FIG. 13, the assembly drawing of the column may display the internal and external shapes of the column in a horizontal arrangement. In the internal shape of the column, a shape of each pass of a tray internal structure, an elevation, a spacing, an installation location of a downcomer, a distributor, a downcomer, a shape of each type of inlet distributor, and the like may be displayed. The assembly drawing of the column may also include nozzle list information 1320, material list information 1330, foundation loading data 1340, and design data information 1350.

According to an embodiment, an example of the nozzle list information 1320 displayed in the assembly drawing of the column is shown in Table 1.

TABLE 1

| SO1 | 1 | I.D600 | t36 | — | SKIRT SLEEVE OPENING FOR W | — |
| SV1~8 | 8 | 4' | SCH.80 | — | SKIRT VENT | — |
| AO1.2 | 2 | 1.0500 × 100 | t17 | — | SKIRT MANWAY | — |

TABLE 1-continued

| MARK | REQ'D NO. | SIZE | SCH. NO. | FLANGE RATING | SERVICE | PROJECTION FROM VESSEL C.L |
|---|---|---|---|---|---|---|
| AO1 | 1 | 8' | SCH.100 | ASME 300# WN.RF | MIN FLOW INLET | 2050 |
| OO7 | 1 | 16" | t17 | ASME 300# WN.RF | BOTTOM LIQUID OUTLET | SEE DWG. |
| WO6 | 1 | 2' | — | ASME 300# FN.RF | PG-PT | 1990 |
| SO1 | 1 | 3' | — | ASME 300# FN.RF | STEAMOUT | 2000 |
| MO6 | 1 | I.D 24" | — | ASME 300# FN.RF | MANHOLE (W/B.F & DAVIT) | 2100 |
| LO3, 4, 7, 8 | 4 | 2' | — | ASME 300# FN.RF | LEVEL | 2000 |
| IO6/IO7 | 2 | 12" | SCH.80 | ASME 300# WN.RF | VAPOR INLET | 2050 |
| MO5 | 1 | I.D 24" | — | ASME 300# FN.RF | MANHOLE (W/B.F & DAVIT) | 2090 |
| MO4 | 1 | I.D 24" | — | ASME 300# FN.RF | MANHOLE (W/B.F & DAVIT) | 2090 |
| OO3/OO4 | 2 | 16" | t17 | ASME 300# WN.RF | TO UPPER COLLER | 2090 |
| MO3 | 1 | I.D 24" | — | ASME 300# FN.RF | MANHOLE (W/B.F & DAVIT) | 2090 |
| LO1, 2, 5, 6 | 4 | 2' | — | ASME 300# FN.RF | LEVEL | 1990 |
| IO3 | 1 | 10" | SCH.100 | ASME 300# WN.RF | FROM UPPER COOLER | 2060 |
| MO2 | 1 | I.D 24" | — | ASME 300# FN.RF | MANHOLE (W/B.F & DAVIT) | 2090 |
| IO2 | 1 | 8" | SCH.120 | ASME 300# WN.RF | FEED INLET | 2050 |
| VO1 | 1 | 6' | SCH.120 | ASME 300# WN.RF | VENT | SEE DWG. |
| CO1 | 1 | 10" | SCH.100 | ASME 300# WN.RF | VAPOR OUTLET | SEE DWG. |
| MO1 | 1 | I.D 24" | — | ASME 300# FN.RF | MANHOLE (W/B.F & DAVIT) | 2090 |
| IO1 | 1 | 6' | SCH.160 | ASME 300# WN.RF | FEED INLET | 2050 |
| GO1 | 1 | 10" | SCH.100 | ASME 300# WN.RF | VENTILATION (W.B.F) | SEE-DWG. |
| MARK | REQ'D NO. | SIZE | SCH. NO. | FLANGE RATING | SERVICE | PROJECTION FROM VESSEL C.L |

NOZZLE TABLE

According to an embodiment, an example of the material list information 1330 displayed in the assembly drawing of the column is shown in Table 2.

TABLE 2

DESIGN DATA

| CODE | | ASME Section VII Division 1 2019 | |
|---|---|---|---|
| CODE STAMP | YES | NATIONAL BOARD REGISTRATION | NO |
| LOCAL REGULATION | NO | SERVICE | NO |
| FLUID | — | SUPPORT TYPE | SKIRT |
| DESIGN PRESS. kg/omg) | 4.5 | CAPACITY M3 | 117.1 |
| INTERNAL TEMP. ° C. | 350 | SPECIFIC GRAVITY | 1 |
| DESIGN PRESS. kg/cm²(g) | F.V | RADIOGRAPHY (SHELL/HEAD) | SPOT/FULL |
| EXTERNAL TEMP. ° C. | 150 | JOINT EFFICIENCY | 0.85/1.0 |

Referring to FIG. 14, the assembly drawing of the column may provide a multi-section view 1410 of a column by considering the height of the column, and may separately display an orientation 1420 of a tray. Other necessary information (not shown) may be further included in the assembly drawing of the column.

FIG. 15 illustrates an embodiment, in which all welding seam lines of a column are expressed in a two-dimensional development drawing and thus interference between the welding seams may be confirmed.

Figure 18:
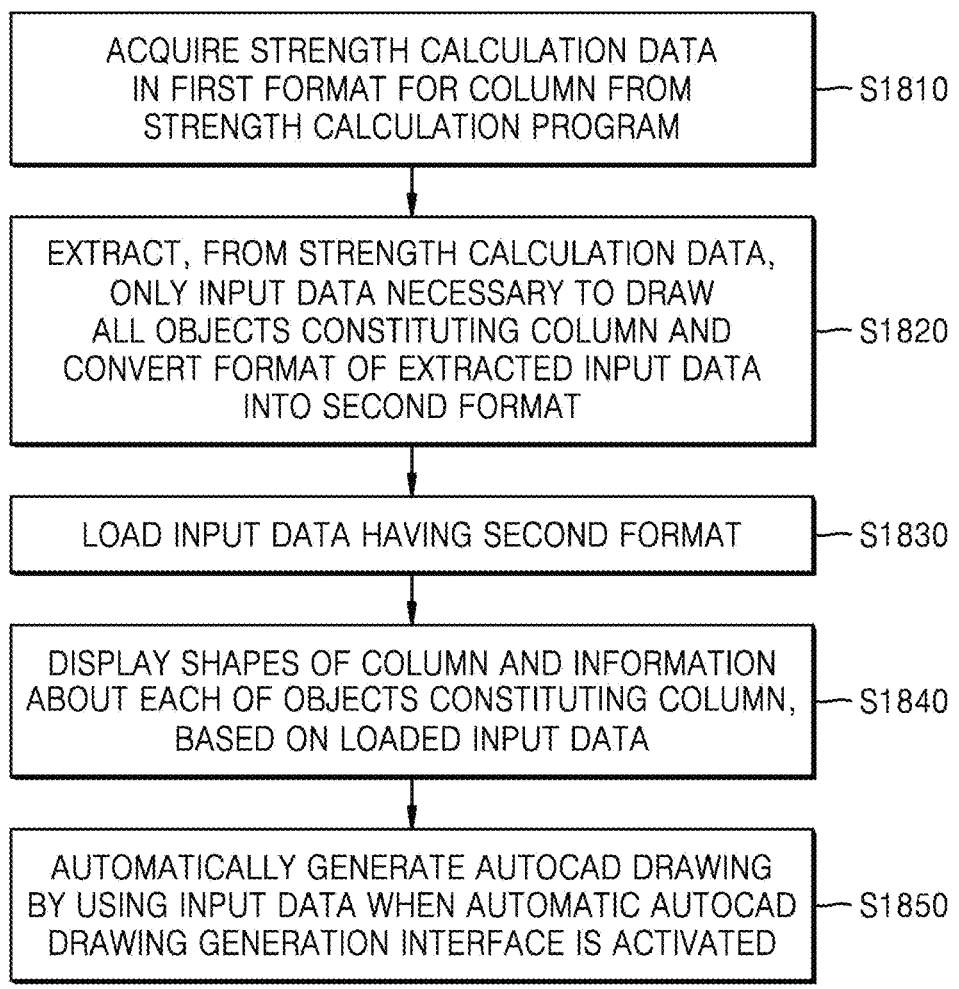
FIG. 18 is a flowchart illustrating an automatic AutoCAD drawing generation method according to an embodiment.

FIG. 18 is a flowchart of an automatic AutoCAD drawing generation method according an embodiment.

A preprocessor may acquire strength calculation data in a first format for a column from a strength calculation program (Operation S1810), and may extract, from the strength calculation data, only input data necessary to draw all the objects constituting the internal and external shapes of the column and convert the format of the extracted input data into a second format (Operation 1820).

After a loading unit loads input data having the second format (operation S1830), a viewer may display the internal and external shapes of the column and information about each of the objects constituting the column, based on the loaded input data (Operation 1840). Next, when the automatic AutoCAD drawing generation interface is activated, an AutoCAD drawing may be automatically generated using the input data (Operation S1850).

Figure 19:
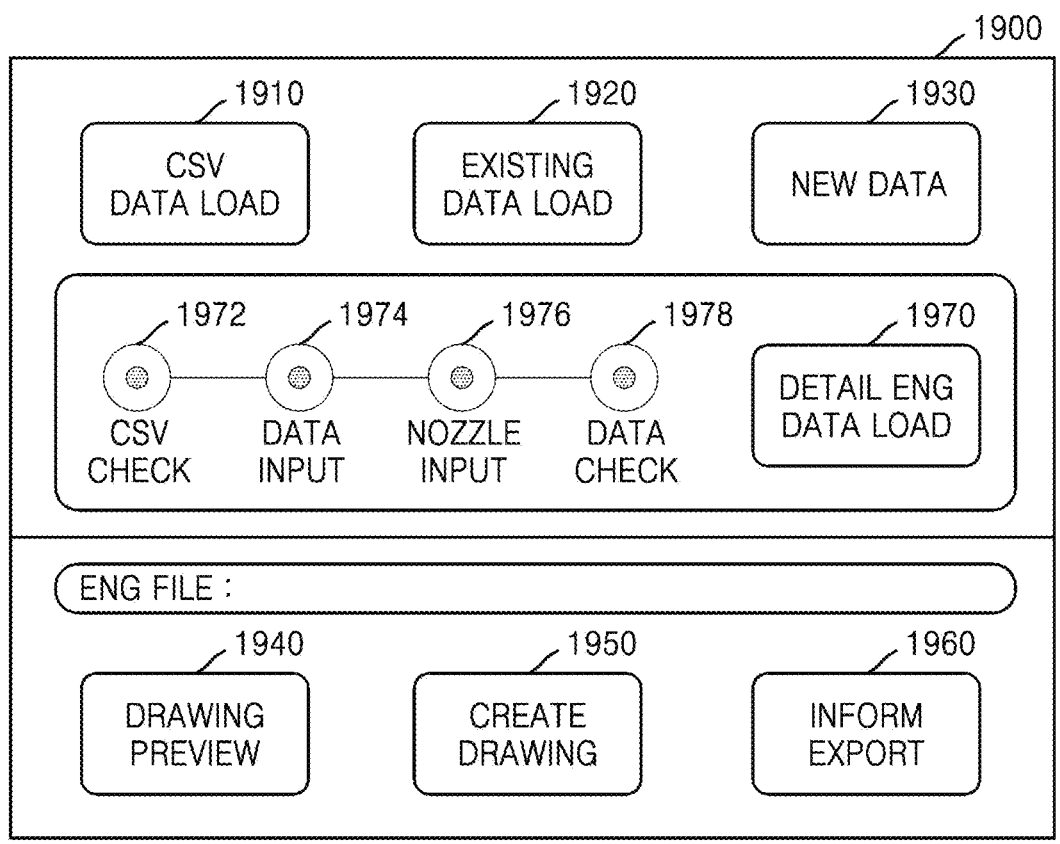
FIG. 19 illustrates a menu unit of an automatic AutoCAD drawing generation device according to an embodiment.

FIG. 19 illustrates a menu unit of the automatic AutoCAD drawing generation device according to an embodiment.

The menu unit 1900 may include data loading interfaces 1910, 1920, and 1930 for loading data, data confirmation portions 1970, 1972, 1974, 1976, and 1978, and drawing interfaces 1940, 1950, and 1960 for generating CAD data.

The drawing interface may include a preview interface 1940 that confirms, in advance, CAD data to be generated, an AutoCAD generator 1950 that generates the CAD data, and an output portion 1960 that outputs the generated CAD data.

Figure 20:
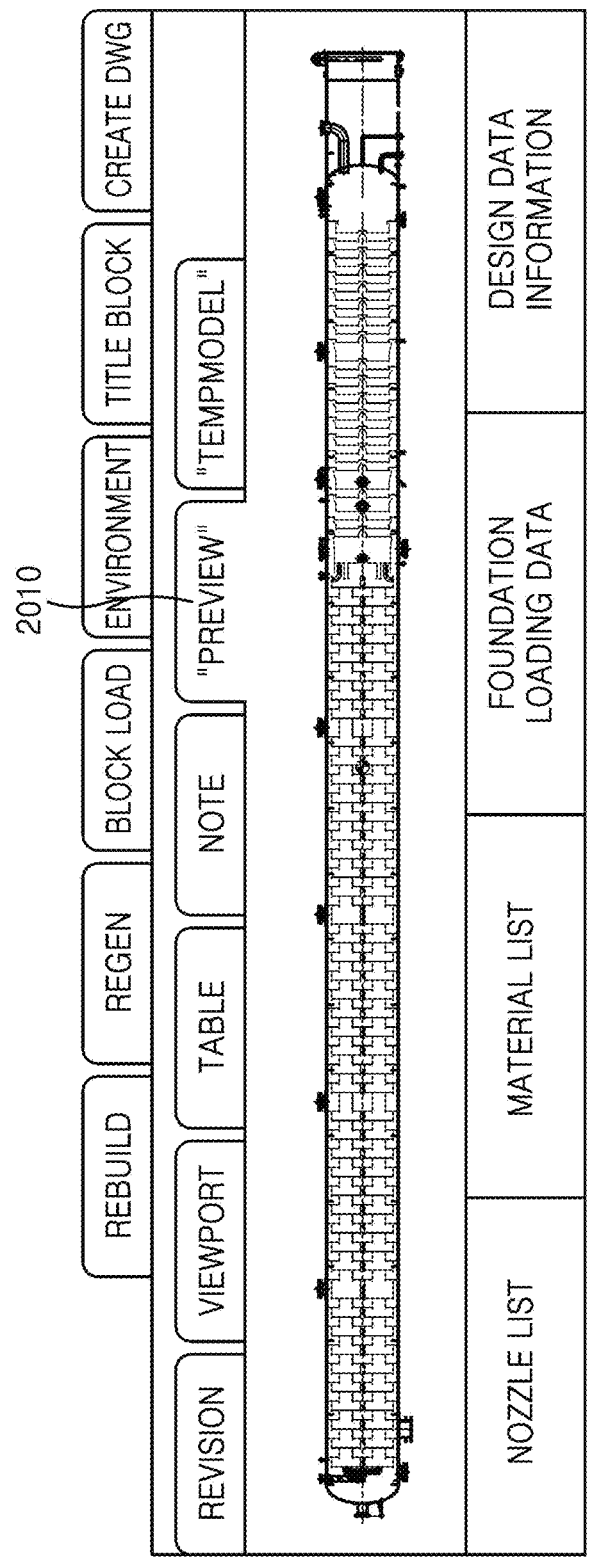
FIG. 20 illustrates an example of a preview screen generated after a preview is activated in a menu unit, according to an embodiment.

According to an embodiment, the preview interface 1940 may generate a preview screen 2010 as shown in the example of FIG. 20 based on input data loaded in the loading interfaces 1910, 1920, and 1930, based on Visual Basic. The preview screen 2010 may include an internal or external shape of a column, nozzle list information, material list information, foundation loading data information, and design data information. When there is an error after checking the preview screen 2010, a user may generate a new preview screen 2010 after correcting data in at least one of a revision tab REVISION, a viewpoint tab VIEWPOINT, a table tab TABLE, and a note tab NOTE. When all errors are corrected, CAD drawings may be generated through an interface 'CREATE DWG'.

The methods of the embodiments may be implemented in the form of program instructions which are executable using various types of computers and may be recorded in a computer-readable medium. The computer-readable medium may include one selected from the group consisting of program instructions, data files, data structures, and combinations thereof. The program instructions recorded on the medium may be specially designed and configured for the present disclosure, or may be selected from program instructions known and available to those of ordinary skill in the computer software industry.

While one or more embodiments have been described with reference to the figures, it will be understood by those of ordinary skill in the art that various changes in form and details may be made therein without departing from the spirit and scope of the disclosure as defined by the following claims.

What is claimed is:

1. A device for automatically generating AutoCAD drawings, the device comprising:
    a processor configured to
        extract, in a first format, only data necessary to draw a column from strength calculation data for the column provided by a strength calculation program, and then convert the extracted data into a data sheet in a second format according to a predetermined rule or reference, wherein the processor receives the strength calculation data about the column from the strength calculation program, extracts data values from a plurality of present positions of the strength calculation data, and combines the extracted values, and
        load the data sheet; and
    a display configured to display at least one of an external shape of the column, an internal shape of the column, a multi-section orientation of the column, and information on each of objects of the column by using the loaded data sheet,
    wherein the display includes
        an automatic AutoCAD drawing generation interface that is activatable only after the data sheet is loaded and generates AutoCAD drawings of the column displayed on the display as being activated by a user's selection after the data sheet is loaded,
        a development drawing interface configured to check all welding seam interference, wherein the development drawing interface displays an area where interference occurs and enables editing of the area where the interference occurs,
        an internal shape icon bar providing an icon related to the internal shape of the column
        an external shape icon bar providing an icon related to the external shape of the column, and
        a nozzle icon bar that provides an icon of a nozzle constituting the column.

2. The device of claim 1, wherein, when the automatic AutoCAD drawing generation interface is activated, a development drawing drawn by unfolding a shape of the column is further generated in addition to the AutoCAD drawings, wherein the development drawing shows a situation of interference with a welding seam, the nozzle, and internal and external attachments.

3. The device of claim 1, wherein the internal shape icon bar includes at least one of a tray, a packing, a distributor, a bed limiter, a support plate, and a collector.

4. The device of claim 3, wherein the icon related to the internal shape of the column is displayed on the internal shape icon bar.

5. The device of claim 1, wherein the processor is further configured to extract an installation position of the internal shape of the column in the first format and an installation position of the nozzle in the first format, and then map the installation position of the nozzle to correspond to the installation position of the internal shape of the column, and convert a mapping result into a data sheet in a second format.

6. The device of claim 1, wherein the development drawing interface is activatable after the loading of the data sheet is completed.

7. A method of automatically generating AutoCAD drawings, the method comprising:
    receiving, by a processor, a data sheet generated only with input data necessary for drawing a column from strength calculation data for the column provided by a strength calculation program;
    receiving, by the processing, the strength calculation data about the column from the strength calculation program;
    extracting, by the processor, data values from a plurality of present positions of the strength calculation data and combining the extracted values;
    loading, by the processor, the input data;
    generating, by the processor, AutoCAD drawings of the column by activating an automatic AutoCAD drawing generation interface on a display by a user's selection after the input data is loaded, the automatic AutoCAD drawing generation interface being activatable only after the input data is loaded;
    inspecting, by a development drawing interface included on the display, all welding seam interference;
    displaying, by the development drawing interface included on the display, an area where interference occurs and enabling editing of the area where interference occurs;
    provisioning, by an internal shape icon bar included on the display, an icon related to the internal shape of the column;
    provisioning, by an external shape icon bar included on the display, an icon related to the external shape of the column, and
    provisioning, by a nozzle icon bar included on the display, an icon of a nozzle constituting the column.

8. The method of claim 7, further comprising generating, by the processor, the data sheet by extracting only data necessary to draw all objects of the column from strength calculation data in a first format, provided by a strength calculation program and obtained for the column, and converting a format of the extracted data into a second format.

9. A method of automatically generating AutoCAD drawings, the method comprising:
    extracting, by the processor, in a first format only data necessary to draw a column from strength calculation data for the column provided by a strength calculation program, and then converting the extracted data into a data sheet in a second format according to a predetermined rule or reference, wherein the processor receives the strength calculation data about the column from the strength calculation program, extracts data values from a plurality of present positions of the strength calculation data and combines the extracted values;
    loading, by the processor, the data sheet; and
    displaying, by a display, at least one of an external shape of the column, an internal shape of the column, a multi-section orientation of the column, and information on each of objects of the column by using the loaded data sheet, said display including an automatic AutoCAD drawing generation interface which is activatable only after the data sheet is loaded and generates an AutoCAD drawing of an object constituting a shape of the column displayed on the viewer as being activated by a user's selection after the data sheet is loaded, inspecting, by a development drawing interface included on the display, all welding seam interference;

displaying, by the development drawing interface included on the display, an area where interference occurs and enabling editing of the area where interference occurs;

provisioning, by an internal shape icon bar included on the display, an icon related to the internal shape of the column;

provisioning, by an external shape icon bar included on the display, an icon related to the external shape of the column, and provisioning, by a nozzle icon bar included on the display, an icon of a nozzle constituting the column.

10. The method of claim 9, wherein the viewer provides:

a shape viewer that displays an internal shape or an external shape of the column.

11. The method of claim 10, wherein, when the development drawing interface is activated, a development drawing, in which interference between welding seams is capable of being checked first before the AutoCAD drawing is generated, is generated and the generated development drawing is further modified to remove the interference.

12. The method of claim 9, wherein the data sheet includes information on an internal shape of a tray and the information on the internal shape of the tray includes shape information for each pass, elevation information, spacing information, and downcomer information, wherein the internal shape of the tray is displayed on the generated AutoCAD drawing and a shape of each pass is displayed on the internal shape of the tray.

13. The method of claim 9, wherein the converting includes:

extracting, by the processor, at least one data, which corresponds to an item preset for each of the objects in order to draw all the objects constituting the column, from a preset position of the strength calculation data in the first format;

generating, by the processor, a mapping table providing general information including unit information corresponding to the item preset in order to draw each of the objects constituting the column; and generating, by the processor, a data sheet by converting a format of at least one data extracted from the preset location or data in the mapping table into the second format.

14. The method of claim 9, wherein the AutoCAD drawing of the column includes information on an orientation of each section of the nozzle, wherein the information on the internal shape of the column includes tray internal shape information, inlet distributor internal shape information, and packing internal shape information.

* * * * *